April 19, 1932.  J. K. LUTHE  1,854,207
MANUALLY OPERABLE CONTROL FOR AUTOMATIC STORAGE HEATERS
Filed April 20, 1927
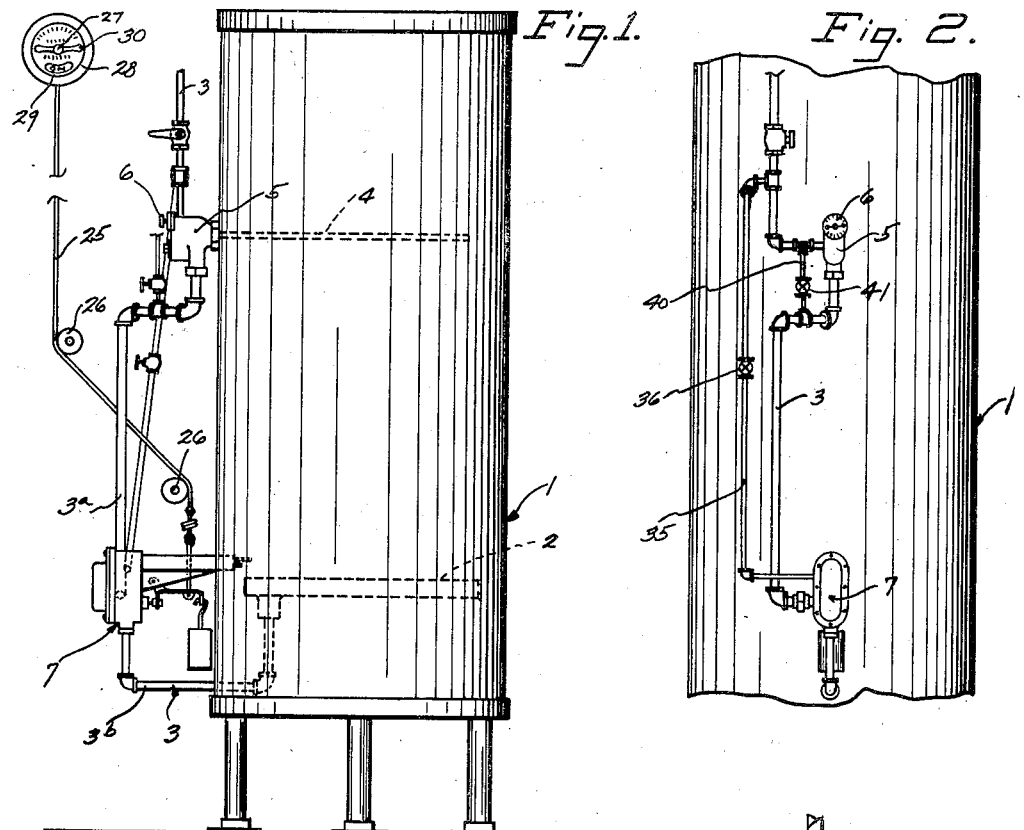
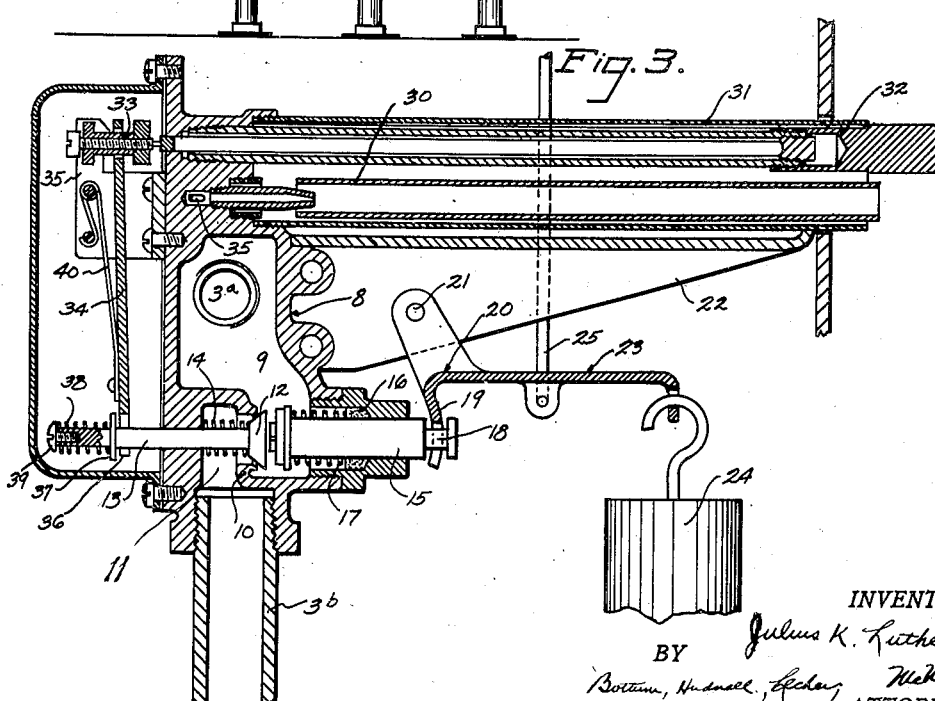
INVENTOR
Julius K. Luthe
BY
Bottum, Hudnall, Fecher, McKenna
and Michael
ATTORNEY Patented Apr. 19, 1932

1,854,207

UNITED STATES PATENT OFFICE

JULIUS K. LUTHE, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

MANUALLY OPERABLE CONTROL FOR AUTOMATIC STORAGE HEATERS

Application filed April 20, 1927. Serial No. 185,143.

This invention relates to a manually controllable automatic hot water storage heater, and in general aims to provide a device of this character which has all the advantages of a conventional automatic hot water storage heater and yet none of the disadvantages of the same.

Automatic hot water storage heaters are well known and to some extent have come into use. Preferably they consist of an insulated tank for the hot water having a heating chamber at the lower end of the tank and a flue space between the outside of the tank proper and a heat insulating shell enclosing the tank proper. In the heating chamber a gas burner is provided and has a pilot burner disposed in cooperative relation therewith, the pilot burner, of course, being lighted at all times. The supply of gas to the main burner in the heating chamber is regulated by a thermostat exposed to the heat of the water in the tank and controlling a valve in the gas supply line which leads to the burner. The supply of gas for the pilot burner is bypassed around this valve. Usually, the thermostat has some means for adjusting the same, and in certain well known types of storage heaters there is a dial adjustment which permits of a predetermining of the temperature at which the water in the tank is to be maintained. With the dial adjusted, the thermostat will permit the gas valve to remain open and the main burner to operate until the water in the tank is of the predetermined temperature, whereupon, the thermostat automatically operates to close the valve in the gas supply line and shuts off the main burner. One of the most serious disadvantages of this type of heater resides in the fact that it continues to operate to maintain a supply of hot water in the tank irrespective of whether hot water is utilized or needed. When the hot water is not utilized or needed the consumption of gas goes on just the same, and no benefits are obtained therefrom, the heat of the water in the tank being dissipated to the surrounding air. Thus there is unnecessary wear and tear on the apparatus, as well as unnecessary expense involved in the consumption of the fuel.

An important object of the present invention is to provide an apparatus having the usual and conventional features and all the advantages of the storage heater as hereinabove set out, but which, in addition, proposes a master valve in the fuel supply line intermediate the thermostatically controlled valve of the storage heater and the burner, the master valve being manually controlled from one or more distant points of control to shut off the supply of gas to the burner independently of the operation of the thermostatically controlled valve of the storage heater when hot water is not utilized or needed. This master valve may also be controlled to permit the thermostatically operated valve of the storage heater to control the supply of gas or fuel when hot water is utilized or needed, or when it is desirable to have the storage heater operate as such. In other words, the automatic operation of the storage heater may be permitted to go on when this is desirable, or this automatic operation may be suspended and all heating of the water stopped.

Another object of the invention resides in the provision of a device of this character wherein the master valve embodies a pilot safety feature which permits of the supply of gas to the main burner only when the pilot light is burning and the master valve and the thermostatically controlled valve of the storage system are properly positioned for this purpose, but which prevents flow of gas to the main burner when the pilot light is extinguished irrespective of the positions or adjustments of the several controls of the apparatus.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a view in side relation showing an automatic storage heater of conventional construction which has the present invention organized therewith.

Figure 2 is a fragmentary view in elevation looking toward the left in Figure 1, and
Figure 3 is a fragmentary sectional view illustrating the master valve and pilot safety features embodied in the storage system in accordance with the present invention.

Referring to the drawings, numeral 1 designates generally, a storage heater which may be of any conventional construction. The storage heater 1 has a burner shown diagrammatically at 2, the burner 2 being supplied with gas or other fuel through a supply pipe 3. As usual, the storage heater is provided with a thermostat 4 subject to the heat of the water in the tank and controlling a valve 5 incorporated in a fuel supply line 3. The thermostatically controlled valve 5 may be of any conventional type, but preferably of the type which has a dial adjustment 6 to permit the valve 5 and thermostat 4 to be set whereby to permit the valve 5 to remain open until the burner 2 has heated the water in the tank 1 to the selected temperature, whereupon the thermostat 4 automatically closes the valve 5 and shuts off the supply of fuel. These features of the device are old and well known and per se form no part of the present invention.

The present invention proposes a provision of a master valve designated generally, at 7, the master valve 7 being incorporated in the supply line 3 intermediate to valve 5 and the burner 2. The master valve 7 comprises a casing 8 having an inlet chamber 9 therein. One section, 3ª, of the gas supply pipe 3 leads into this chamber 9 from the thermostatically controlled valve 5. A ported partition 10 is provided within the casing 8 and separates the inlet chamber 9 from an outlet chamber 11 with which the section 3ᵇ of the gas supply line communicates. The section 3ᵇ of the gas supply line leads to the burner 2. A valve member 12 coacts with the valve seat formed around the port of the partition 10 and has a valve stem 13 slidably mounted in the casing 8. A spring 14 encircling the valve stem 13 and engaging the valve member 12 tends to normally maintain the valve member 12 open. For the purpose of effecting closure of the valve member 12 a slidable plunger 15 is mounted in a stuffing box 16 and is urged inward under the influence of the coil spring 17. When permitted to move inwardly under the influence of the spring 17, the plunger 15 engages the valve member 12 and forces the same to a closed position against its seat. The outer end of the plunger 15 is provided with an annular groove 18 in which is fitted the forked end 19 of a bell crank lever 20 which is pivoted at 21 on a bracket 22 provided for holding the casing 8 to the tank. The arm 23 of the bell crank lever 20 has attached at its outer end a weight 24 tending to pull the arm 23 downwardly because of the force of gravity. Also attached to the arm 23 is a wire or cable 25 leading upwardly and around suitable pulleys 26 to one or more distant points of control, at which points the cable 25 is attached to a winding arbor 27 of a manually operable controlled device 28. The manually operable controlled device may have a suitable indicator 29 associated therewith to show when its handle 30 is adjusted to an on or off position. This manually operable controlled device may be of any suitable construction, and merely serves to wind up the wire or cable 25 to an extent sufficiently to rock the bell crank lever 20 to cause the forked end 19 thereof to pull the slidable plunger 15 outwardly against the action of its spring 17 whereby to permit the spring 14 to open the valve member 12. Suitable means may be embodied in the control mechanism to releasably hold it in any adjustment, and this means may comprise a spring projected tooth or detent mounted on the casing of the controlled device or a part fixed to the casing and engaging in notches in a disk or the like, fixed to the arbor 27.

A pilot burner is provided in cooperative relation with the main burner 2 and consists of a Bunsen pilot construction 30 mounted within a casing or tube 31 and projecting immediately over one portion of the burner 2. The thermostat 32 is exposed to the direct action of the flame of the pilot and is operatively engaged as at 33 with a lever 34 at a point offset from its fulcrum on a bracket 35. The lever 34 has its lower end notched to embrace the valve stem 13. The notched end 36 coacts with a washer 37 yieldably held in position on the stem 13 by spring 38, the latter abutting a screw 39 threaded onto the end of the valve stem 13. A spring 40 biases the lever 34 to a position where it disengages the washer 37 and permits the spring 14 to act to open the valve 12. This condition obtains as long as the pilot burner is lighted and its flame plays on the thermostat 32. Should the pilot burner become extinguished, the operation of the thermostat results in swinging the lever 34 to the left as viewed in Fig. 3. This swinging of the lever 34 causes it to engage the washer 37 whereby the valve member 12 is moved to close position, the spring 38 being stiffer than the spring 14 to provide for this operation. The proposed construction of the thermostat and its connection with the lever 34 form no part of this invention per se and is fully set out in the pending application of Frank A. Gauger, et al., filed May 29, 1925, Serial No. 33,698 now Patent No. 1,680,263.

A by-pass 35ª is provided and extends from a point beyond the valve 5 into the valve casing 8 at a point which communicates with the pilot burner. This by-pass 35ª has a metering valve 36 incorporated therein, and its purpose is to supply gas or fuel for the pilot burner irrespective of the positions of the valve 5 or valve member 12.

To prevent popping of the burner when the slow acting thermostat 4 gradually closes the valve 5, a by-pass 40 may be provided around the valve 5, the by-pass 40 having a metering valve 41 therein. This by-pass 40 permits a very small amount of gas to flow around the valve 5 so as to always have the small flame at the burner 2 when the valve 12 is opened.

With this arrangement, when the handle 30 is turned to the on position, the cable 25 is wound up to lift the arm 23 of the bell crank lever 20 and pull the plunger 15 outwardly, thereby leaving the valve 12 open if the pilot burner is lighted. The burner 2 then operates under the control of the ordinary storage equipment, or, in other words, the main burner operates to heat the water and maintains the water heated to a predetermined temperature under the control of the thermostat 4 and valve 5. When it is desired to suspend the operation of the storage heater, the handle 30 is turned to unwind the cable 25 to permit the weight 24 to drop and swing the bell crank 20 in such manner that the plunger 15 is permitted to slide quickly inwardly under the action of its spring 17 and under the action of the bell crank 20. This inward movement of the plunger 15 causes it to engage the valve member 12 and close the valve member, thereby shutting off the supply of gas from the burner irrespective of the action of the thermostat 4 and its valve 5. This control is exercised at any convenient point in the house, or place where the heater is used. It may be placed in any room, for example, the manually operable control may be positioned in the bath room or in the kitchen, or in any other room, while the storage heater is in the basement.

The invention claimed is:

A manually controllable automatic storage heater comprising a storage tank, a burner therefor, a fuel supply line leading to the burner, a thermostatically operated control valve influenced by the heat of the water in the storage tank for regulating the supply of fuel to the burner through the supply line, a master valve in the supply line and operable independently of the control valve for controlling the supply of fuel to the burner through the control valve, a spring pressed plunger independent of the master valve and movable into or out of contact therewith to either close the master valve to suspend the operation of the storage heater or to permit the master valve to open for the normal operation of the heater, and means manually operable from a distant point for setting the plunger with respect to the master valve.

In witness whereof, I hereto affix my signature.

JULIUS K. LUTHE.